Figure 1:
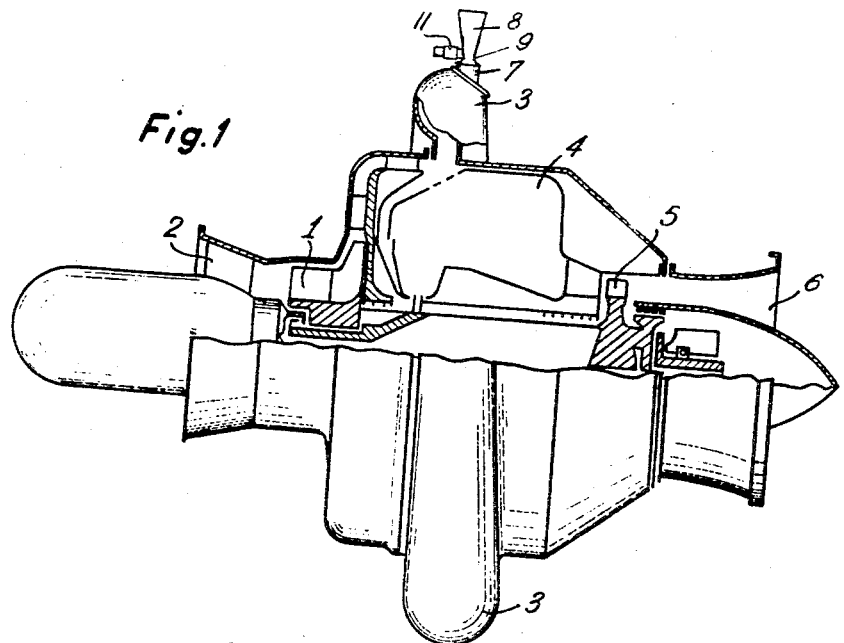

April 26, 1960

J. SZYDLOWSKI 2,934,094

OUTPUT LIMITER PROVIDING A VARIABLE
CROSS-SECTIONAL AREA PASSAGE FOR
COMPRESSED FLUID INSTALLATIONS
Filed July 13, 1955

United States Patent Office 2,934,094
Patented Apr. 26, 1960

2,934,094

OUTPUT LIMITER PROVIDING A VARIABLE CROSS-SECTIONAL AREA PASSAGE FOR COMPRESSED FLUID INSTALLATIONS

Joseph Szydlowski, Bordes, France

Application July 13, 1955, Serial No. 521,854

Claims priority, application France July 19, 1954

4 Claims. (Cl. 138—46)

This invention relates to output limiters of the type utilized in compressed-fluid installations.

In installations of this general type, wherein compressed air is supplied from a suitable generator, for example and preferably of the type disclosed in the U.S. patent application Ser. No. 432,561, now Patent No. 2,795,372, filed by applicant on May 26, 1954 for "Turbine Driven Compressed Air Generator," it is necessary, on the one hand, to restrict the air output as a function of temperature upstream of the turbine and, on the other hand, to have a very low starting load; consequently, the cross-sectional area of the air passage must be throttled by adequate valve means.

As a rule, the installation comprises adjustable valve member responsive either to the permissible air-generator temperature, for instance through the medium of a thermostatic regulator, or to the air output measured differentially through a venturi tube acting on this adjustable valve member, generally by means of a servo-control device. According to another known solution a sonic venturi may be provided for limiting the output, as well as, up or downstream with respect to this venturi, a two-position valve (starting position and normal running position) controlled mechanically or automatically through a device incorporated or not in the starting system.

In order to simplify installations pertaining to these known types it is the essential object of this invention to provide an output limiter providing a variable cross-sectional area passage for compressed-fluid installations, comprising a sonic venturi tube mounted in the delivery duct of the compressed fluid generator, and a valve member located either in or adjacent to the neck portion of the venturi tube and controlled automatically for varying the cross-sectional area of said portion as a function of the pressure existing upstream of said neck portion. Thus, the weight and over-all dimensions of the throttling device are reduced to a substantial extent.

Figure 2:
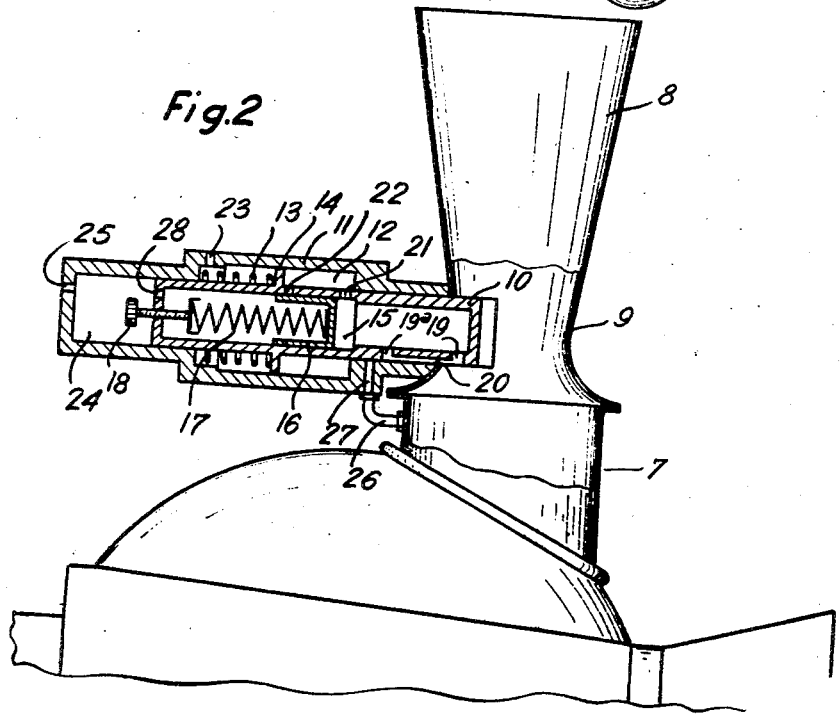

The attached drawing forming part of this specification illustrates diagrammatically by way of example one form of embodiment of the invention. In the drawing:

Fig. 1 is a part-sectional side view of a compressed-air generator unit equipped with a variable-section output limiter according to this invention; and Fig. 2 shows on a larger scale with parts broken away an output limiter providing a variable cross-sectional area passage according to this invention.

The device illustrated in Fig. 1 is a compressed-air generator of the type described and illustrated in the aforesaid U.S. patent application. This device comprises a centrifugal compressor 1 drawing atmospheric air through an inlet duct 2, the compressed air being delivered, on the one hand, into an outlet volute casing 3 and, on the other hand, into a combustion chamber 4, the gas produced in this chamber being fed to a single- or multistage turbine 5 and finally exhausted to the atmosphere through an exhaust duct 6.

A duct 7 adapted to supply compressed air to a utilisation apparatus (not shown) leads from the wall of the outlet volute casing 3. A sonic venturi tube 8 is located between the duct 7 and the ultilisation apparatus. The cross-sectional area of the neck portion 9 of this venturi tube is so calculated that the permissible limit temperature of the compressed-air generator is not attained irrespective of the conditions obtained downstream of this venturi tube.

In the neck portion 9 of the venturi tube 8 there is mounted a retractable or collapsible valve member 10 adapted when moved across this neck portion to vary the cross-sectional area of the passage therein. This valve member 10 is actuated automatically by a servo-control devices actuated in turn by the pressure of the air required for operating the utilisation apparatus.

This servo-control device comprises a case 11 having slidably mounted therein the retractable or collapsible valve member 10 and incorporating a chamber 12 containing a coil spring 13 bearing against an outer shoulder or flange 14 of the retractable valve member 10 which acts as a piston. The retractable valve member 10 has formed therein a bore 15 in which a small piston 16 is adapted to move axially against the resistance of a compression spring 17 adjustable by means of a screw 18. The valve member 10 has two holes 19, 19a drilled therethrough communicating with each other through a longitudinal outer groove 20, another pair of aligned holes 21, 22 being drilled in diametrally oppsite positions through the valve member, as shown. That portion of chamber 12 which is positioned on the left-hand side of the flange 14 communicates with the surrounding atmosphere through an orifice 23 so as to vent any air leakages occurring between the outer edge of flange 14 and the inner wall of chamber 12. The chamber 24 formed at the rear of case 11 communicates with the atmosphere through a hole 25. A pipe 26 connects the duct 7 with a passage 27 formed through the wall of case 11 so that compressed air may be fed to the groove 20 and chamber 15 either directly by duct 7 when the valve member 10 is projected out to a position decreasing the cross sectional area of the neck portion 9 to its smaller value or through pipe 26 and passage 27 when, the valve member moving in the reverse direction, the groove 20 is closed by the case 11.

The device described hereinabove operates as follows:

As long as the pressure of the air delivered to the utilisation apparatus through the venturi tube 8 is below a predetermined value the valve member 10 projects inside the neck portion 9 under the pressure exerted by the coil spring 13 in order to decrease the cross sectional area of said neck portion to its smaller value. At the same time the central spring 17 adjusted to balance the action of air at said pressure predetermined value on the small piston 16 urges said small piston 16 against the bottom of the chamber 15 so as to close the orifice 21. When the air pressure exceeds the aforesaid predetermined value, air entering the chamber 15 through the groove 20 and orifices 19, 19a exerts a pressure against the free face of piston 16; this piston compresses the central spring 17 and opens the passage 21 so that the air pressure may now act on the annular piston 14, thereby compressing the larger spring 13 and moving the valve member 10 to increase the cross-sectional area of the neck portion 9. The chamber 15 remains fed with air.

When the air pressure decreases in the venturi tube 8 the piston 16 is returned by its spring 17 to a position in which the passage 21 is again closed but during this movement the passage 22 is opened so that the compressed air in chamber 12 may be vented to the atmosphere through the orifices 28, 25 and the spring 13 will finally restore the valve member 10 to its initial position.

Of course, many modifications may be brought to the embodiment shown and described herein by way of example, without departing from the spirit and scope of the invention as defined in the appended claims.

What I claim is:

1. An output limiter for compressed fluid lines, comprising a sonic venturi tube mounted in the compressed-fluid line, a valve member movable transversely with respect to said venturi tube between a position wherein the cross-sectional area of the neck portion of said venturi tube has a minimum value and a position wherein said cross-sectional area has its full value, and automatic means for adjusting the position of said valve member inside said neck portion in response to the pressure of the compressed fluid in the line upstream of said valve member.

2. An output limiter for compressed fluid lines, comprising a sonic venturi tube mounted in the compressed-fluid line, a valve member movable transversely with respect to said venturi tube between a position wherein the cross-sectional area of the neck portion of said venturi tube has a minimum value and a position wherein said cross-sectional area has its full value, and automatic means for adjusting the position of said valve member inside said neck portion in response to the pressure of the compressed fluid in the line upstream of said valve member, wherein the means for adjusting the position of the valve member inside said neck portion comprises means for projecting said valve member inside said neck portion in order to obtain said minimum value of its cross-sectional area as long as the pressure of the compressed fluid in the line is below a predetermined value, means for immediately moving said valve member to increase the cross-sectional area of said neck portion up to its full value when said pressure exceeds said predetermined value, and means for controlling the action of said moving means in relation to the value of said pressure.

3. An output limiter for compressed fluid lines, comprising a sonic venturi tube mounted in the compressed-fluid line, a valve member movable transversely with respect to said venturi tube between a position wherein the cross-sectional area of the neck portion of said venturi tube has a minimum value and a position wherein said cross-sectional area has its full value, and automatic means for adjusting the position of said valve member inside said neck portion in response to the pressure of the compressed fluid in the line upstream of said valve member, wherein the valve member consists of a hollow body communicating with the compressed fluid line upstream of the venturi tube neck portion and movable transversally with respect to said venturi tube from a position projecting inside said neck portion to a position abreast of the inner wall of said neck portion and wherein the means for adjusting the position of said valve member inside said neck portion comprises piston means integral with said neck portion and a piston the outer surface of said hollow body and a piston member movable inside said hollow body, a casing housing said piston means, means for controlling the position of said piston member inside said hollow body in relation to the pressure of the compressed fluid in the line, means for applying said pressure on the face of said piston means directed towards said venturi tube with said pressure at a predetermined value inducing an immediate displacement of said piston member inside said hollow body so that the cross-sectional area of said neck portion attains its full value, and means for venting the part of said casing limited by said face of the piston member with the pressure in the line decreased and inducing an immediate displacement of said piston member in a reverse direction so that the cross-sectional area of said neck portion is restricted to said minimum value.

4. An output limiter for compressed fluid lines, comprising a sonic venturi tube mounted in the compressed-fluid line, a cylindrical casing the axis of which is perpendicular to that of said tube having an open circular end connected to the neck portion of said venturi tube, a hollow cylindrical body communicating with the compressed fluid line upstream of said venturi tube, movable in said casing from a position projecting inside said neck portion to a position abreast of the inner wall of said neck portion, integral with an outer flange acting as a piston in said casing and formed on its cylindrical wall with two orifices disposed between said flange and the end of said hollow body which projects inside said neck portion, a small piston movable inside said hollow body, an adjustable spring located between said small piston and the other end of said hollow body which is provided with a hole, means for adjusting said spring, and a second spring surrounding said hollow body and bearing on said flange and on said casing which is provided with a hole in the region where said second spring is located, the distance between the two orifices formed on the cylindrical wall of said hollow body being greater than the axial dimension of said small piston.

References Cited in the file of this patent

UNITED STATES PATENTS

| 1,892,115 | McKee | Dec. 27, 1932 |
| 2,033,678 | Buirk | Mar. 10, 1936 |
| 2,302,705 | Marco | Nov. 24, 1942 |
| 2,409,433 | Hunter | Oct. 15, 1946 |
| 2,560,634 | Colley | July 17, 1951 |
| 2,693,110 | Terrell | Nov. 2, 1954 |

FOREIGN PATENTS

| 116,070 | Great Britain | Mar. 20, 1919 |